United States Patent
Chen et al.

(10) Patent No.: US 8,350,149 B2
(45) Date of Patent: Jan. 8, 2013

(54) HOUSING ASSEMBLY FOR ELECTRONIC DEVICE

(75) Inventors: Jung-Pin Chen, Kaohsiung Hsien (TW); Shu-Chen Lin, Kaohsiung Hsien (TW); Shan-Yao Chen, Kaohsiung Hsien (TW)

(73) Assignee: King Slide Works Co., Ltd., Kaohsiung Hsien (TW)

( * ) Notice: Subject to any disclaimer, the term of this patent is extended or adjusted under 35 U.S.C. 154(b) by 412 days.

(21) Appl. No.: 12/797,073

(22) Filed: Jun. 9, 2010

(65) Prior Publication Data

US 2010/0317414 A1 Dec. 16, 2010

(30) Foreign Application Priority Data

Jun. 10, 2009 (TW) .............................. 98119487 A

(51) Int. Cl.
*H01J 5/00* (2006.01)
*H05K 7/02* (2006.01)
*H04M 1/00* (2006.01)

(52) U.S. Cl. ....... 174/50; 361/810; 361/730; 455/575.1; 455/347

(58) Field of Classification Search .... 455/575.1–575.3; 361/728, 729, 730, 752, 796, 800, 801, 802, 361/803, 807, 810; 174/50
See application file for complete search history.

(56) References Cited

U.S. PATENT DOCUMENTS

| | | | |
|---|---|---|---|
| 5,469,982 A | 11/1995 | Gordecki et al. | |
| 5,946,395 A | 8/1999 | Petrella et al. | |
| 7,072,624 B2 | 7/2006 | Zheng et al. | |
| 7,116,780 B2 | 10/2006 | Sun | |
| 7,149,306 B2 | 12/2006 | Pan | |
| 7,333,777 B2 | 2/2008 | Qin et al. | |
| 7,542,788 B2 * | 6/2009 | Lee | 455/575.1 |
| 7,747,297 B2 * | 6/2010 | Koibuchi et al. | 455/575.4 |
| 7,774,033 B2 * | 8/2010 | Lee | 455/575.4 |
| 8,041,407 B2 * | 10/2011 | Wakihara | 455/575.4 |
| 8,155,718 B2 * | 4/2012 | Byun et al. | 455/575.4 |
| 2003/0219117 A1 | 11/2003 | Sun | |
| 2004/0203518 A1 * | 10/2004 | Zheng et al. | 455/90.3 |
| 2004/0204001 A1 * | 10/2004 | Chen et al. | 455/550.1 |

* cited by examiner

*Primary Examiner* — Zachary M Pape
*Assistant Examiner* — Binh Tran
(74) *Attorney, Agent, or Firm* — Rosenberg, Klein & Lee

(57) ABSTRACT

A housing assembly includes a first housing having first positioning holes, a second housing having second positioning holes, and an assembly unit connected between the first and second housings and including two assembly parts. Multiple engaging devices each include a first engaging member and a second engaging member. The engaging devices are connected to the first and second positioning holes by first and second resilient members. An operation device is connected to the engaging devices and includes first and second release members which are respectively connected to the assembly parts. A link is connected to the assembly unit and connected with the first and second release members. An operation member is connected to the link to move the first or second release members of each engaging device and disengage the first and second release members from the first or second positioning holes of the first or second housings.

9 Claims, 10 Drawing Sheets

HOUSING ASSEMBLY FOR ELECTRONIC DEVICE

FIELD OF THE INVENTION

The present invention relates to a housing assembly, and more particularly, to a housing assembly for electronic devices.

BACKGROUND OF THE INVENTION

Generally, the housing assembly for electronic devices depends on multiple screws to connect the parts of the housing assembly. The assembly quality of the housing assembly for electronic devices, such as the connection of the cases of the housing assembly, depends on how firm that the screws are connected to the cases of the housing assembly. However, it is a time consuming task to screw the screws one by one and the screws are easily loosened or dropped because of the damage of the threaded holes in the housing assembly. These factors affect the connection of the cases of the housing assembly. Therefore, there is another housing assembly for electronic devices provided in the market.

The convention housing assemblies known to applicant is disclosed in U.S. Pat. No. 5,946,395 "Housing assembly for an electronic device" to Petrella et al., U.S. Pat. No. 7,116,780 "Housing assembly of a portable electronic device" to Sun, and U.S. Pat. No. 7,149,306 "Housing assembly of portable electronic device" to Pan, all of which are provided for reference in the present application.

Petrella et al. disclose a first housing portion which includes multiple hooks and tabs on two opposite sides thereof. A second housing portion includes multiple hook acceptors for engagement with the hooks of the first housing portion. Multiple tabs are located on the other side of the second housing portion and a slidable element is located between the first and second housing portions. The slidable element has multiple notches with which the tabs of the first and the second housing portions are engaged so that the first and second housing portions are connected to each other.

Sun discloses multiple housings and each housing has multiple protrusions. A U-shape slider is slidably connected to the housings and includes multiple slots which are located corresponding to the protrusions of the housings so that the protrusions are engaged with the slots to assemble the housings together. However, when disengaging the housings, the housings are separated such that the disclosure is not suitable for the users to replace a single housing plate. Pan discloses a similar assembly as Sun.

Therefore, the disclosures mentioned above cannot provide the users a housing assembly that is able to be disengaged from each other within a short period of time.

The present invention intends to provide a housing assembly for electronic devices and the housing assembly can be easily and quickly disengaged and replaced.

SUMMARY OF THE INVENTION

The present invention relates to a housing assembly for electronic devices, and the assembly comprises a first housing having multiple first positioning holes, a second housing having multiple second positioning holes, and an assembly unit connected between the first and second housings. At least two engaging devices are connected to the assembly unit and each engaging device includes a first engaging member and a second engaging member. A first resilient member is applied to the first engaging member so that the first engaging member is orientated toward one of the first positioning holes of the first housing. A second resilient member is applied to the second engaging member so that the second engaging member is orientated toward one of the second positioning holes of the second housing. An operation device includes a first release member connected to one of the at least two engaging devices and connected to the assembly unit. A second release member is connected to the other of the at least two engaging devices. A link is connected to the assembly unit and connected with the first and second release members. An operation member is connected to the link so as to move the link and the first and second release members. The first release member includes a first guide portion and a second guide portion. The second release member includes a first guide portion and a second guide portion. The two respective first guide portions of the first and second release members contact the first engaging member of the engaging device respectively. The two respective second portions of the first and second release members contact the second engaging member of the second engaging device respectively. When the operation member is shifted toward the first direction, the first and second release members are moved by the link, and the first engaging member of each engaging device is disengaged from the first positioning holes of the first housing by the movement of the first guide portions of the first and second release members. Therefore, the first housing can be removed from the assembly unit. When the operation member is shifted toward the second direction, the first and second release members are moved by the link, and the second engaging member of each engaging device is disengaged from the second positioning holes of the second housing by the movement of the second guide portions of the first and second release members. Therefore, the second housing can be removed from the assembly unit.

The first engaging member has a first inclined portion which is in contact with the first guide portion of the first release member and the first guide portion of the second release member. The second engaging member has a second inclined portion which is in contact with the second guide portion of the first release member and the second guide portion of the second release member.

Each of the engaging devices includes a frame and a fixing member which is movably connected to the frame. The frame has a transverse space and a longitudinal opening which extends through the transverse space. The first and second engaging members are located in the transverse space of the frame. The first resilient member is located between the first engaging member and the fixing member. The second resilient member is located between the second engaging member and the fixing member.

The first release member of the operation device is connected to the first pair of the engaging devices, and the second release member is connected to the second pair of the engaging devices. The first and second release members are driven by their respective links so as to move the first and second engaging members of the pair of the engaging devices.

A resilient device includes a resilient member which is located between the assembly unit and the operation device so that the operation device moves to an initial position by the resilient member. The resilient device includes a base and a push member which extends through the base. The push member includes a contact portion contacting the base. The push member is pushed relative to the base by the resilient member such that the push member contacts the first and second release members of the operation device.

The operation member includes a mounting member fixed to the link and a rotary member is connected to the mounting member so as to move the link which drives the first and second release members.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
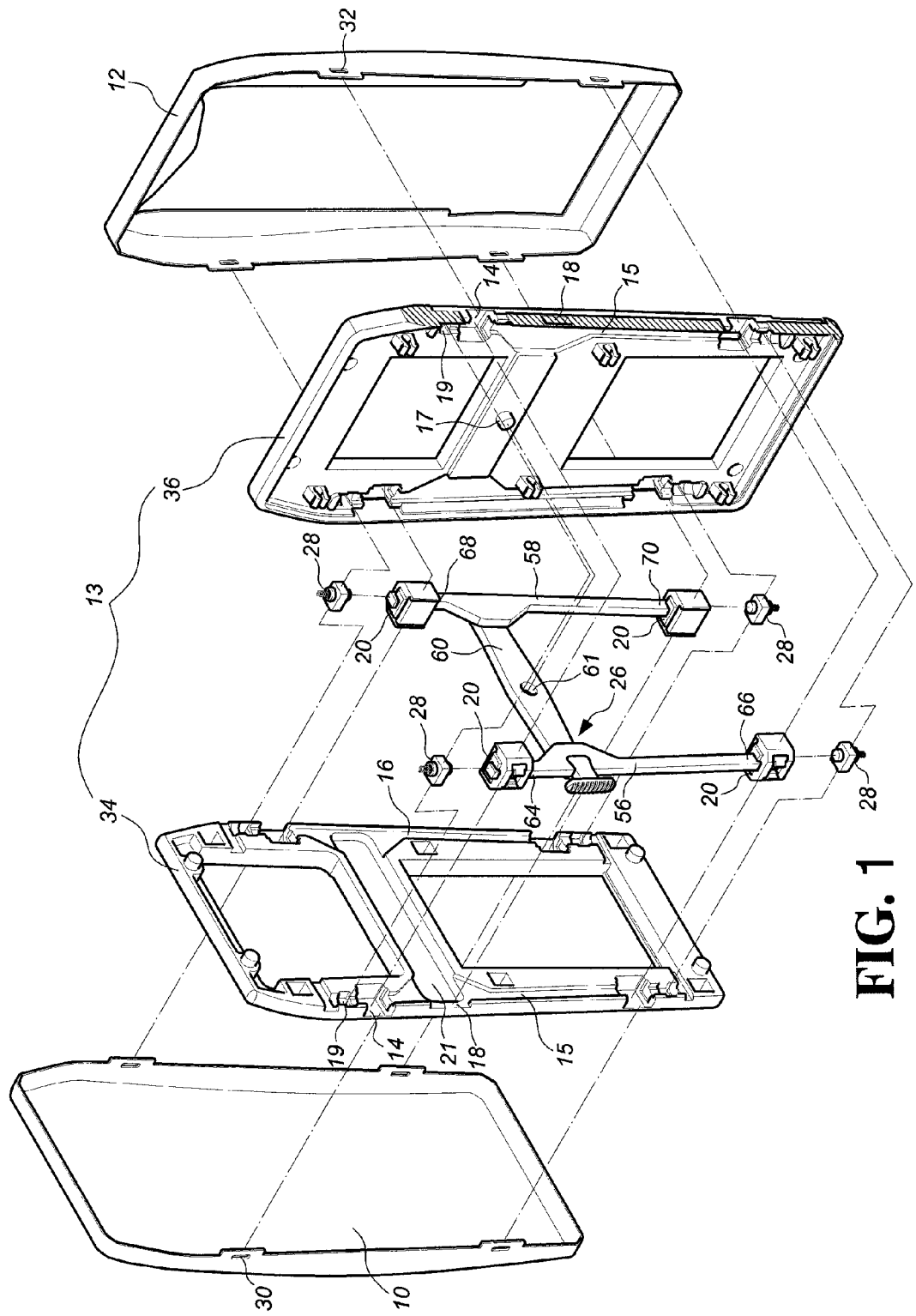
FIG. 1 is an exploded view to show the first embodiment of the present invention.
Figure 2:
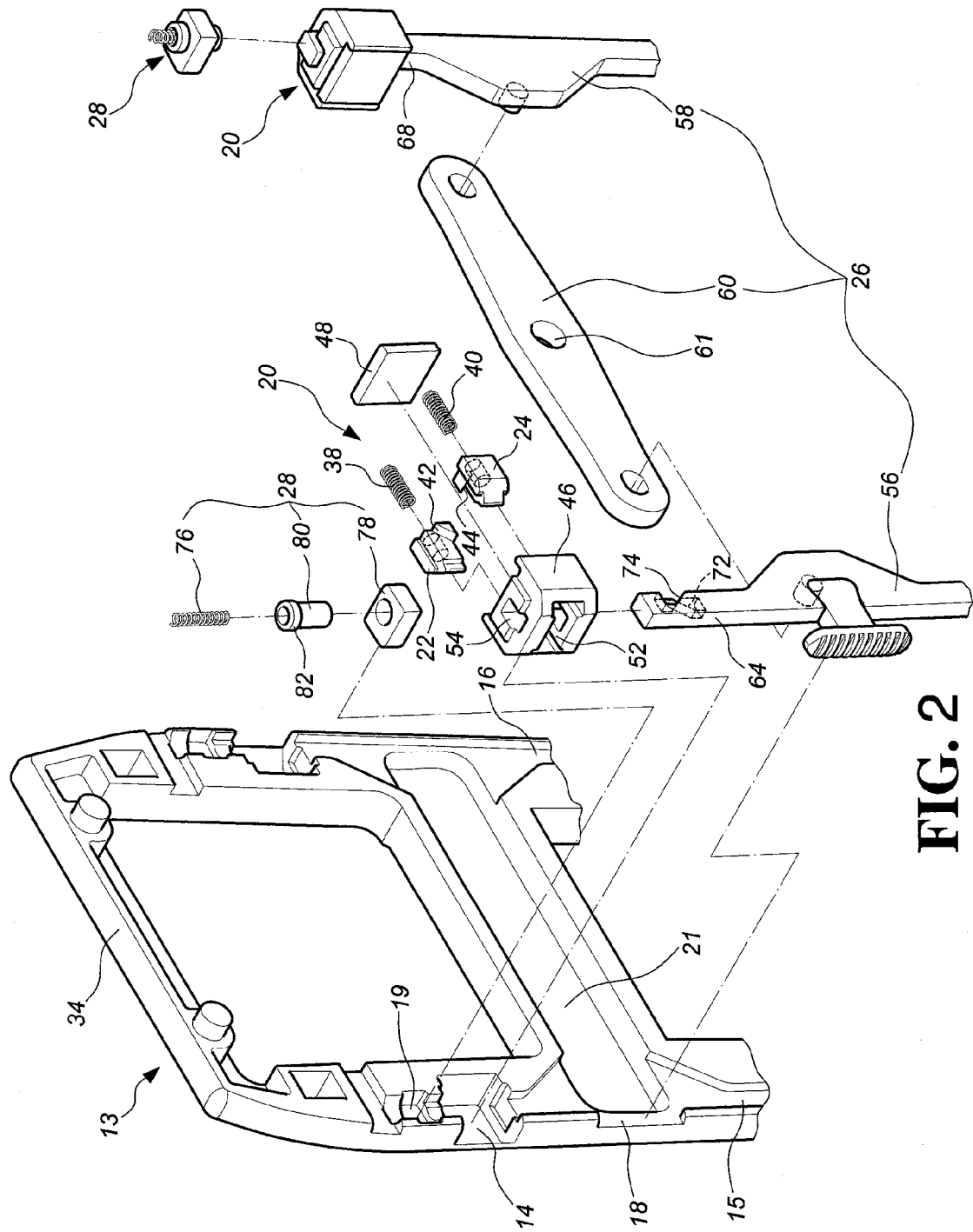
FIG. 2 is an exploded view to show a portion of the first embodiment of the present invention.

FIG. 1 is an exploded view to show the first embodiment of the present invention, wherein the housing assembly comprises a first housing 10, a second housing 12 and an assembly unit 13 which is connected between the first and second housings 10, 12. At least two engaging devices 20, as shown in FIG. 2, each engaging device 20 comprises a first engaging member 22 and a second engaging member 24 so as to respectively provide means for the first and second housings 10, 12 to be respectively connected the assembly units 13. An operation device 26 is able to release the multiple engaging devices 20 simultaneously. Multiple resilient devices 28 which provide the ability that the operation device 26 moves back to its initial position. In this embodiment, the first housing 10 has multiple first positioning holes 30 and each first positioning hole 30 is located corresponding to the first engaging member 22 of each engaging device 20. The second housing 12 has multiple second positioning holes 32 and each second positioning hole 32 is located corresponding to the second engaging member 24 of each engaging device 20. The assembly unit 13 comprises a first assembly part 34 and a second assembly part 36 which is connected to the first assembly part 34.

Figure 3:
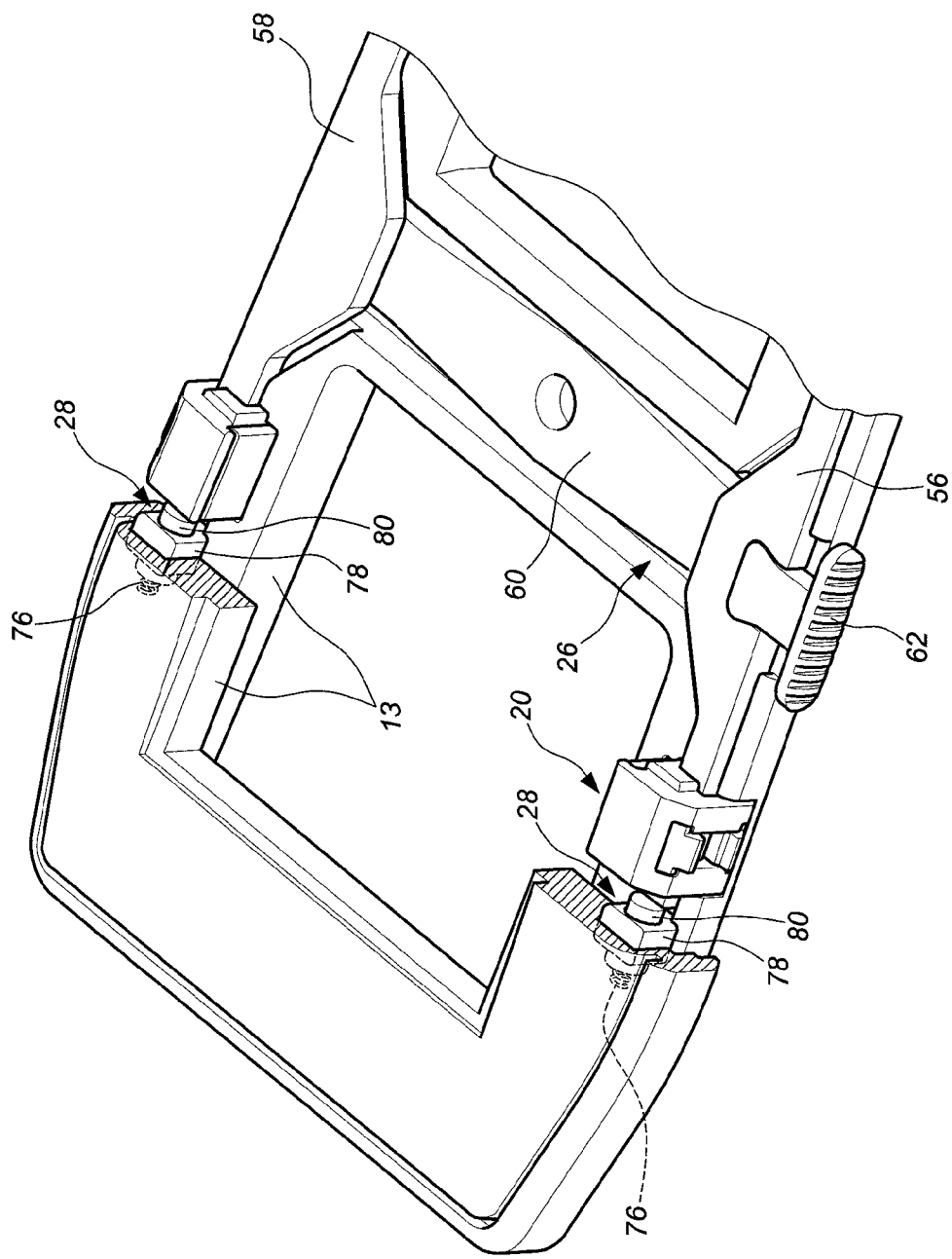
FIG. 3 is a perspective view to show a portion of the first embodiment of the present invention.
Figure 4:
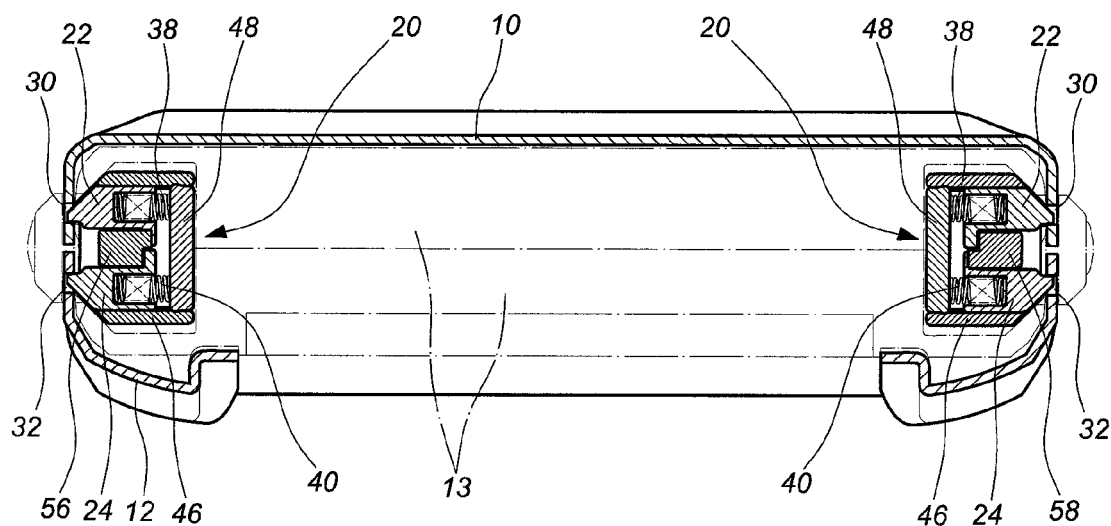
FIG. 4 is a cross sectional view of a portion of the first embodiment of the present invention.

FIGS. 2 to 4 show the relationship between each of the engaging devices 20 and the assembly unit 13, wherein the assembly unit 13, corresponding to each engaging device 20, has a chamber 14 so that the engaging device 20 is securely accommodated in the chamber 14. Each engaging device 20 includes a first resilient member 38 applied to the first engaging member 22 so that the first engaging member 22 is orientated toward one of the first positioning holes 30 of the first housing 10. A second resilient member 40 is applied to the second engaging member 24 so that the second engaging member 24 is orientated toward one of the second positioning holes 32 of the second housing 12. The first engaging member 22 has a first inclined portion 42 and the second engaging member 24 has a second inclined portion 44. In this embodiment, the engaging device 20 includes a frame 46 and a fixing member 48 which is movably connected to the frame 46. The frame 46 has a transverse space 52 and a longitudinal opening 54 which extends through the transverse space 52. The first and second engaging members 22, 24 are located in the transverse space 52 of the frame 46. The first resilient member 38 is located between the first engaging member 22 and the fixing member 48. The second resilient member 40 is located between the second engaging member 24 and the fixing member 48.

The operation device 26 includes a first release member 56 connected to one of the at least two engaging devices 20 or a first pair of the at least two engaging devices 20. A second release member 58 is connected to the other of the at least two engaging devices 20 or a second pair of the at least two engaging devices 20. A link 60 is connected to the assembly unit 13 and the first and second release members 56, 58. An operation member 62 is connected to the link 60 so as to move the link 60 and the first and second release members 56, 58. The first release member 56 is connected to the assembly unit 13 and includes a first longitudinal space 15 so that the first release member 56 is movable in the first longitudinal space 15. The first release member 56 includes a first end 64 and a second end 66 which is located in opposite to the first end 64, the first and second ends 64, 66 respectively extend through the longitudinal openings 54 of the frame 46 corresponding thereto. The second release member 58 is the same as the first release member 56 and is connected to the assembly unit 13 and includes a second longitudinal space 16 so that the second release member 58 is movable in the second longitudinal space 16. The second release member 58 includes a first end 68 and a second end 70 which is located in opposite to the first end 68. The first and second ends 68, 70 respectively extend through the longitudinal openings 54 of the frame 46 corresponding thereto. The first assembly part 34 of the assembly unit 13 has a transverse space 21 in which the link 60 is moveable. Besides, the link 60 has a pivot portion 61 at a center thereof such as a circular hole. The any of the assembly parts of the assembly unit 13 includes a pivot 17, such as the circular protrusion on the second assembly part 36 as shown in FIG. 1 so that the pivot portion 61 is mounted to the pivot 17 and the link 60 is pivoted relative to the assembly unit 13. According to another embodiment of the present invention, the pivotal relationship between the pivot portion 61 of the link 60 and the pivot 17 of the assembly unit 13 can also be that the previous one is a protrusion and the latter one is a circular hole which is complementary to the protrusion, or made by a pin.

Each end (including the first and second ends 64, 66) of the first release member 56 includes a first guide portion 72 and a second guide portion 74. The first and second guide portions 72, 74 of the first release member 56 are respectively located corresponding to the first and second inclined portions 42, 44 of the first and second engaging members 22, 24 of the engaging device 20. Each end (including the first and second ends 68, 70) of the second release member 58 includes a first guide portion 72 and a second guide portion 74. The first and second guide portions 72, 74 of the second release member 58 are respectively located corresponding to the first and second inclined portions 42, 44 of the first and second engaging members 22, 24 of the engaging device 20.

In this embodiment, the first and second release members 56, 58 respectively extend into the transverse spaces 52 via the longitudinal spaces 54, and are respectively connected to the frame 46 by fixing members 48. The first and second engaging members 22, 24 are located in the transverse space 52 of the frame 46 so that the multiple engaging devices 20 and the operation device 26 form a mechanism.

The relationship between the engaging device 20 and the operation device 26 is that the operation member 62 connected to the link 60 so that the first and second release members 56, 58 are moved with the movement of the link 60. The first and second guide portions 72, 74 of the first and second release members 56, 58 optionally push the first inclined portion 42 of the first engaging member 22 or the second inclined portion 44 of the second engaging member 24, according to the direction of the operation member 62 is moved. Accordingly, the first engaging member 22 can be disengaged from the first positioning holes 30 of the first housing 10 or the second engaging member 24 can be disengaged from the second positioning holes 32 of the second housing 12.

In one preferable embodiment, the assembly unit 13 has an operation window 18 located corresponding to the operation member 62 so that the operation member 62 is movable in the operation window 18. The user can move the operation member 62 in the first direction or a second direction which is opposite to the first direction, such that the first and second release members 56, 58 are moved by the operation of the operation member 62. The resilient devices 28 are located corresponding to the first and second ends 64, 66 of the first release member 56 of the operation device 26, and the first and second ends 68, 70 of the second release member 58 as shown in FIG. 1.

Each resilient device 28 is located between the assembly unit 13 and the first and second release members 56, 58. The assembly unit 13 has an extension space 19 corresponding to the resilient device 28 and the extension space 19 communicates with the chamber 14. Therefore, each resilient device 28 is located in the extension space 19 and applies to the first and second release members 56, 58. The resilient device 28 includes a resilient member 76 and the first and second release members 56, 58 are moved in response to the resilient force of the resilient member 76, so that the first and second release members 56, 58 move to their initial positions after the first and second release members 56, 58 are released by the operation member 62 of the operation device 26. In this embodiment, the resilient device 28 includes a base 78 and a push member 80 which movably extends through the base 78. The resilient member 76 is located between the push member 80 and the assembly unit 13. The push member 80 is pushed relative to the base 78 by the resilient member 76. By the contact between the contact portion 82 of the push member 80 and the base 78, the push member 80 provides constant resilient force to the first and second release members 56, 58 of the operation device 26. Therefore, when the force that the first and second release members 56, 58 pushes the resilient device 28 is released, the first and second release members 56, 58 can be pushed back to their initial positions by the resilient device 28.

Figure 5:
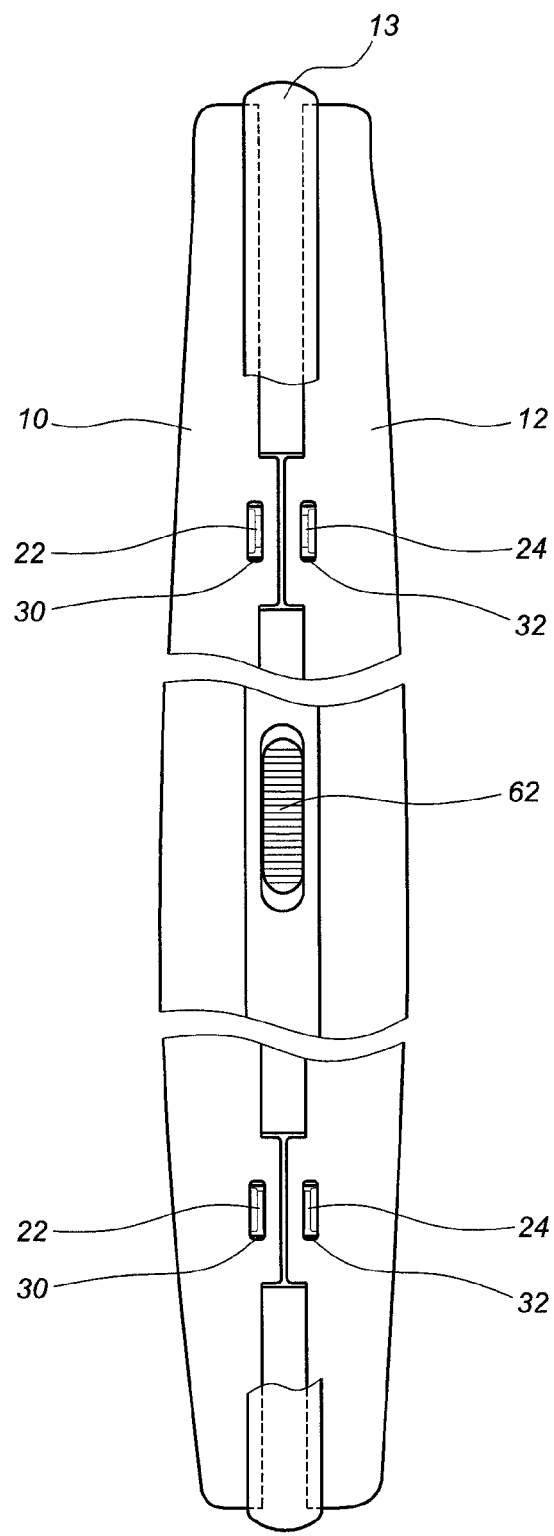
FIG. 5 is a side view of the first embodiment of the present invention.

FIG. 5 shows that, between the first and second housings 10, 12 and the assembly unit 13, the first and second engaging members 22, 24 of the multiple engaging devices 20 are engaged with each other.

Figure 6:
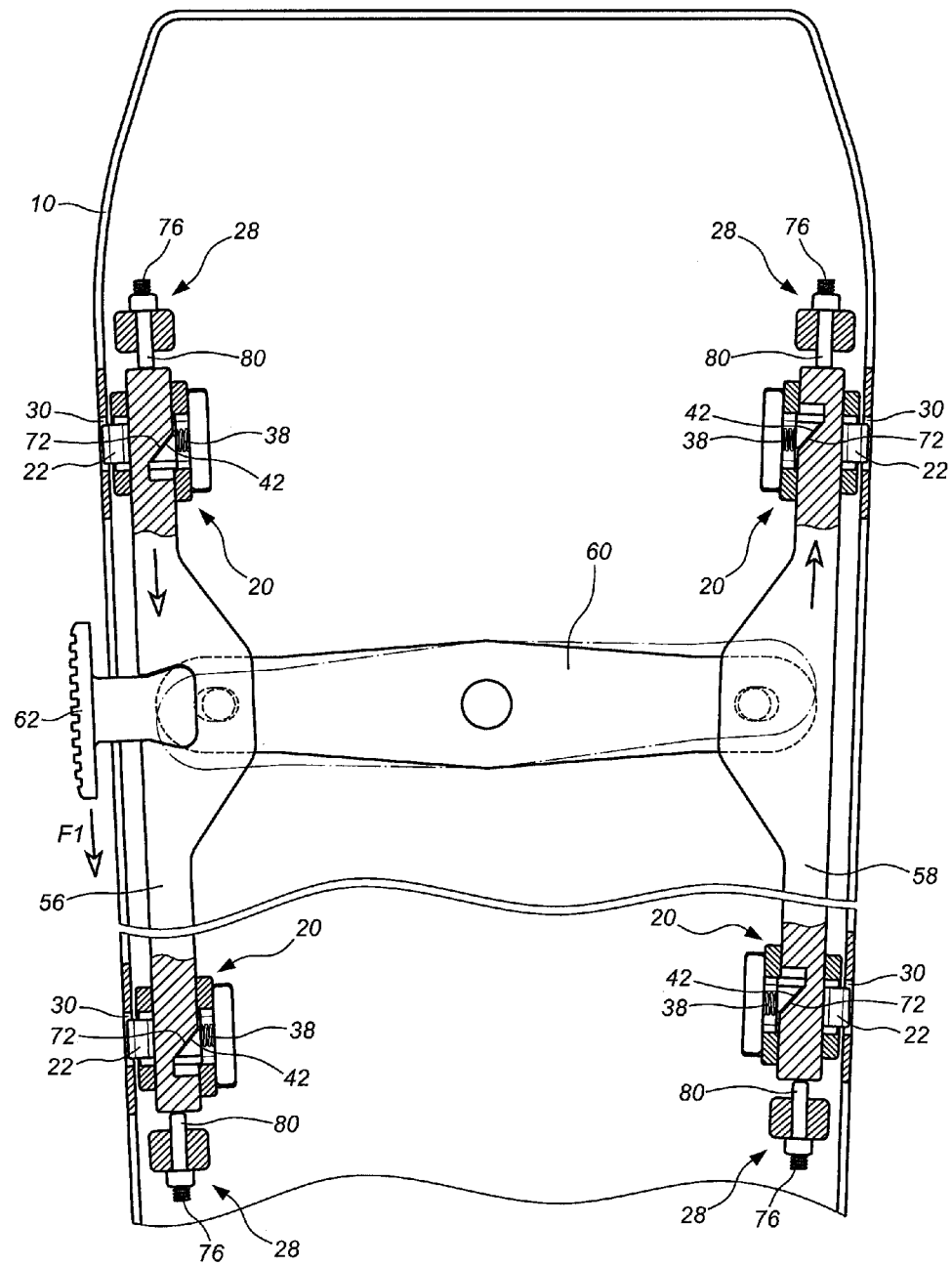
FIG. 6 shows the operation steps of the removal of the first housing from the first embodiment of the housing assembly of the present invention.
Figure 7:
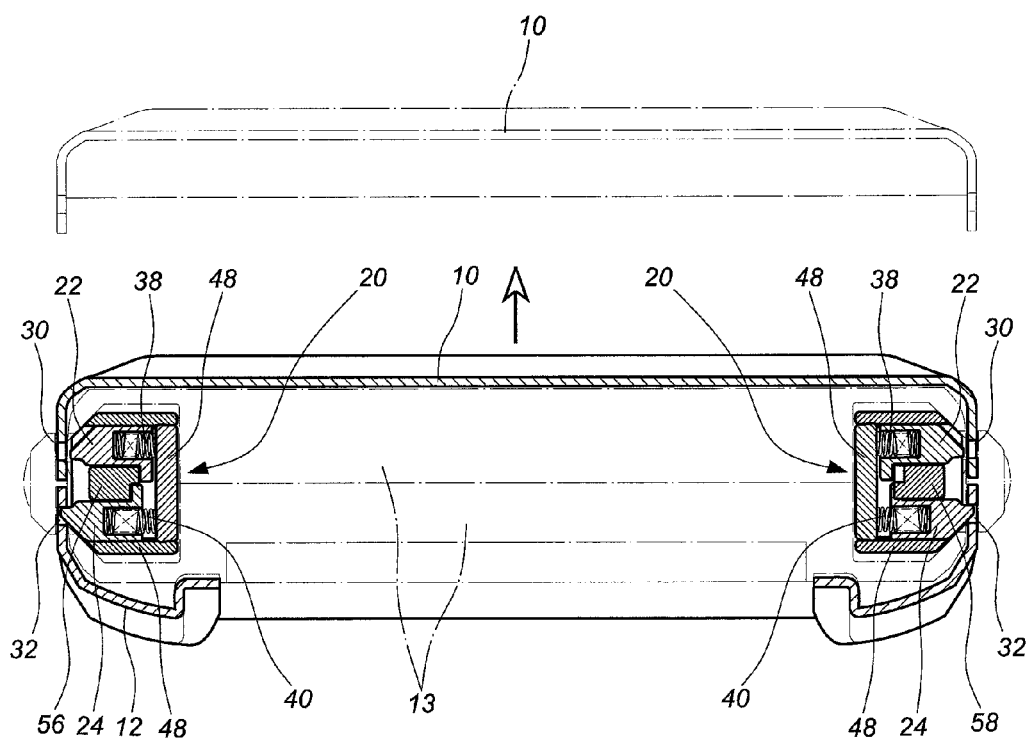
FIG. 7 shows that the first housing is removed from the first embodiment of the housing assembly of the present invention.

FIGS. 6 and 7 show that the first housing 10 can be removed from the assembly unit 13. The user applies a force F1 in the first direction as shown by arrowhead in the drawings to the operation member 62, the operation member 62 drives the link 60 which moves the first and second release members 56, 58 in the longitudinal direction. The first engaging member 22 of each engaging device 20 is moved by the first guide portion 72 of the first and second release members 56, 58 and compresses the first resilient member 38. The first engaging member 22 is then removed from the first positioning hole 30 of the first housing 10 such that the first housing 10 can be removed from the assembly unit 13. Besides, when the force F1 is released by releasing the operation member 62, the first and second release members 56, 58 automatically move back to their initial positions by the push member 80 of the resilient device 28 responded to the force of the resilient member 76.

Figure 8:
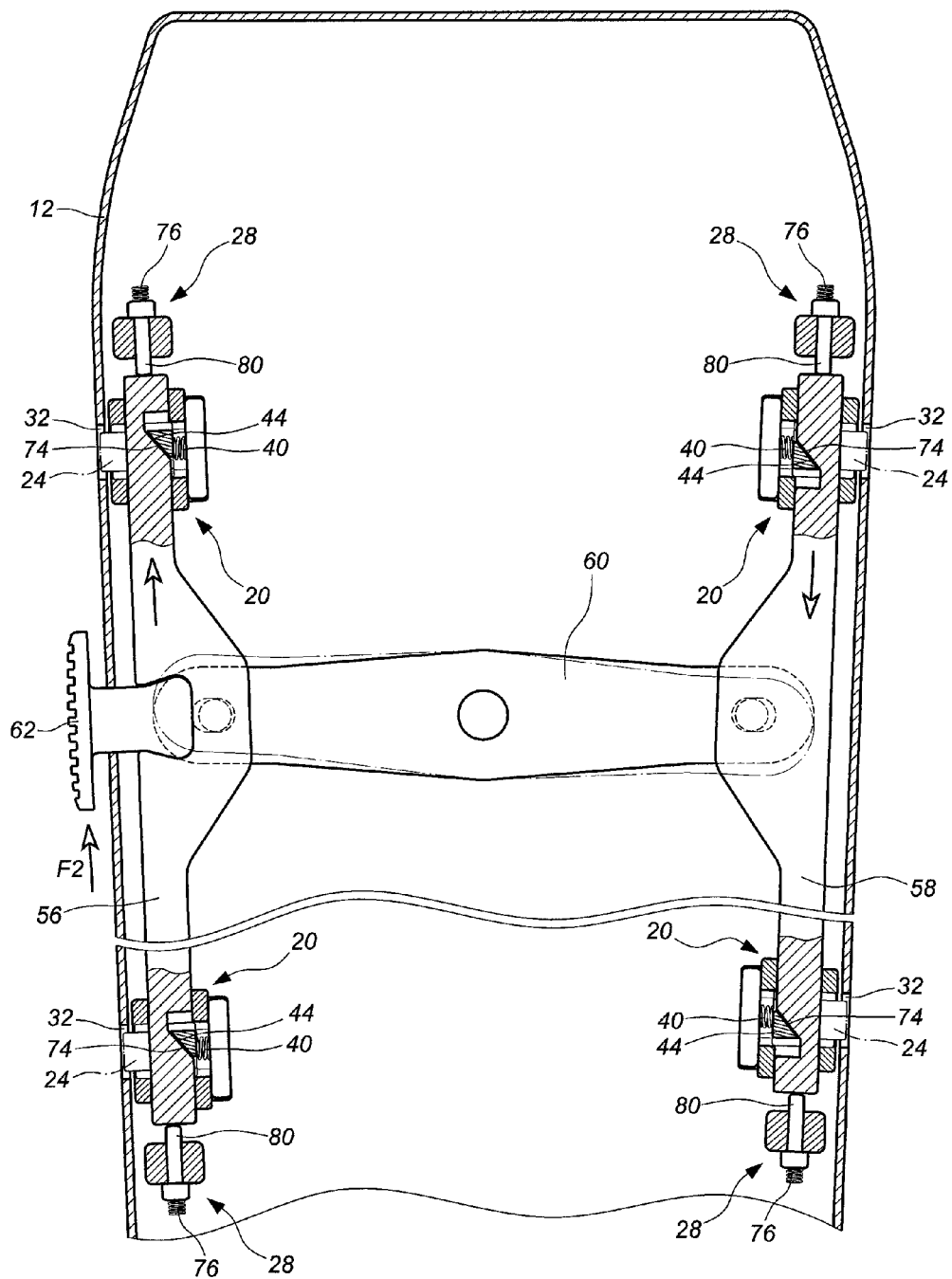
FIG. 8 shows the operation steps of the removal of the second housing from the first embodiment of the housing assembly of the present invention.
Figure 9:
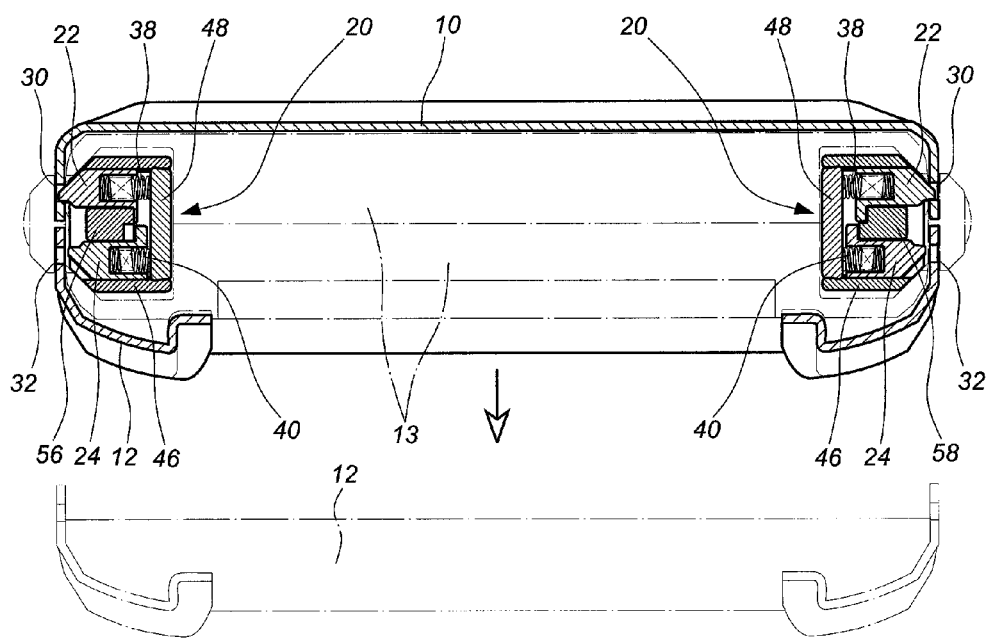
FIG. 9 shows that the second housing is removed from the first embodiment of the housing assembly of the present invention.

FIGS. 8 and 9 show that the second housing 12 can be removed from the assembly unit 13. The user applies a force F2 in the second direction as shown by arrowhead in the drawings to the operation member 62, the operation member 62 drives the link 60 which moves the first and second release members 56, 58 in the longitudinal direction. The second engaging member 24 of each engaging device 20 is moved by the second guide portion 74 of the first and second release members 56, 58 and compresses the second resilient member 40. The second engaging member 24 is then removed from the second positioning hole 32 of the second housing 12 such that the second housing 12 can be removed from the assembly unit 13. Besides, when the force F2 is released by releasing the operation member 62, the first and second release members 56, 58 automatically move back to their initial positions by the push member 80 of the resilient device 28 responded to the force of the resilient member 76.

Figure 10:
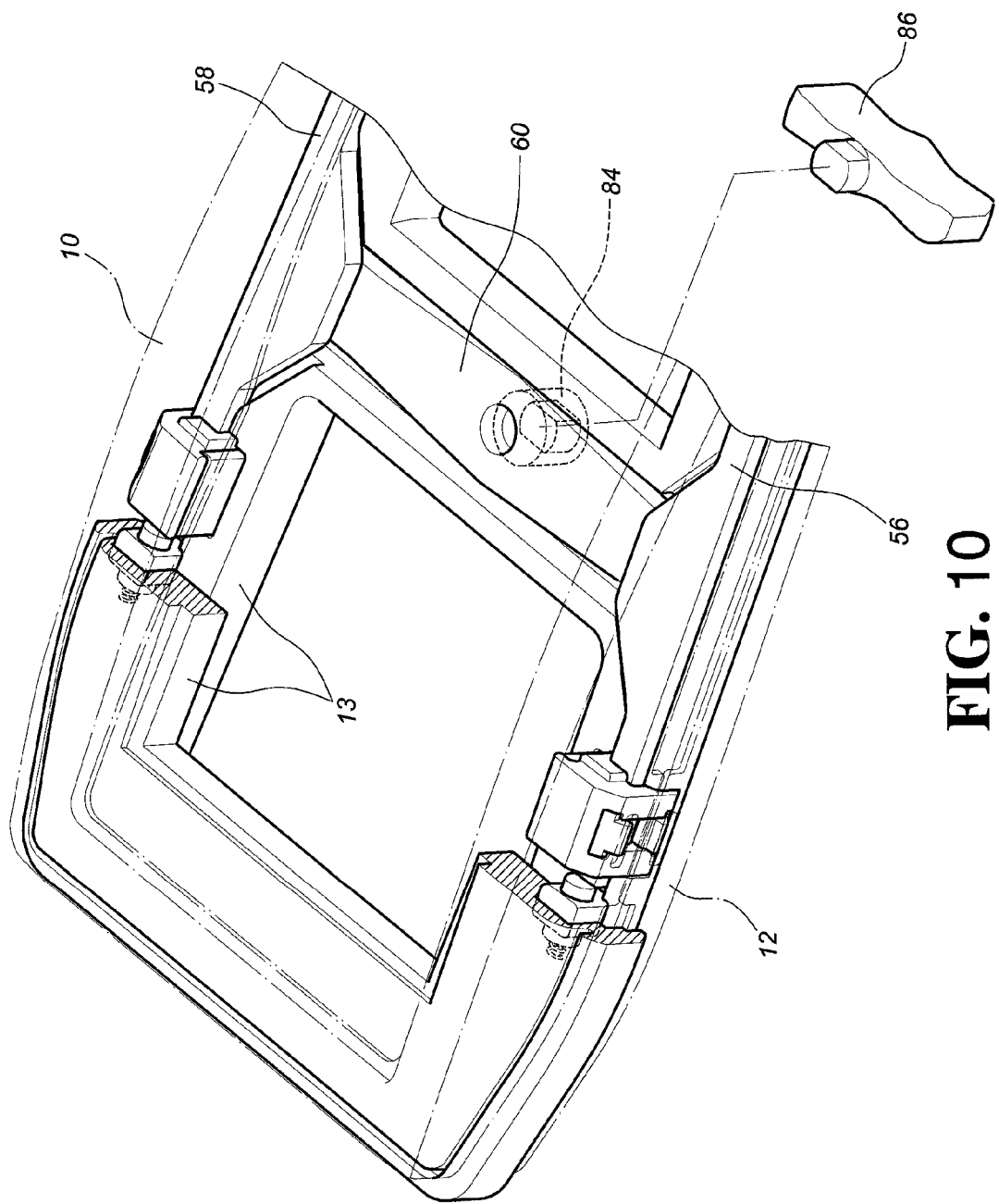
FIG. 10 shows the second embodiment of the housing assembly of the present invention.

FIG. 10 shows that the operation member can also be a mounting member 84 with a non-circular hole and the mounting member 84 is fixed to the link 60. By using a tool, such as the rotary member 86, to be engaged with the mounting member 84, so that the user rotates an angle to swing the link 60 and the first and second release members 56, 58 are simultaneously moved by the link 60. The first and second housings 10, 12 then can be removed from the assembly unit 13.

The electronic device in the embodiments is applied to a portable communication electronic product, especially for the cellular phones. By the convenient replacement of the first and second housings 10, 12, the users can conveniently enjoy the replacement of the housing plates of the cellular phones to illustrate their personality and various faces on their cellular phones.

While we have shown and described the embodiment in accordance with the present invention, it should be clear to those skilled in the art that further embodiments may be made without departing from the scope of the present invention.

What is claimed is:

1. A housing assembly for electronic devices, comprising:
a first housing having multiple first positioning holes;
a second housing having multiple second positioning holes;
an assembly unit connected between the first and second housings;
at least two engaging devices connected to the assembly unit and each engaging device including a first engaging member and a second engaging member, a first resilient member applied to the first engaging member so that the first engaging member is orientated toward one of the first positioning holes of the first housing, a second resilient member applied to the second engaging member so that the second engaging member is orientated toward one of the second positioning holes of the second housing, and an operation device including a first release member connected to one of the at least two engaging devices and the assembly unit, a second release member connected to the other of the at least two engaging devices and the assembly unit, a link connected to the assembly unit and the first and second release members, an operation member connected to the link so as to move the link and the first and second release members, the first release member including a first guide portion and a second guide portion, the second release member including a first guide portion and a second guide portion, the two respective first guide portions of the first and second release members contacting the first engaging member of the engaging device respectively, the two respective second portions of the first and second release members contacting the second engaging member of the second engaging device respectively.

2. The housing assembly as claimed in claim 1, wherein the first engaging member has a first inclined portion which is in contact with the first guide portion of the first release member and the first guide portion of the second release member, the second engaging member has a second inclined portion which is in contact with the second guide portion of the first release member and the second guide portion of the second release member.

3. The housing assembly as claimed in claim 1, wherein the engaging device includes a frame and a fixing member which is movably connected to the frame, the frame has a transverse space and a longitudinal opening which extends through the transverse space, the first and second engaging members are located in the transverse space of the frame, the first resilient member is located between the first engaging member and the fixing member, the second resilient member is located between the second engaging member and the fixing member.

4. The housing assembly as claimed in claim 1, wherein a resilient device includes a resilient member which is located between the assembly unit and the operation device so that the operation device moves to an initial position by the resilient member.

5. The housing assembly as claimed in claim 4, wherein the resilient device includes a base and a push member which extends through the base, the push member includes a contact portion contacting the base, the push member is pushed relative to the base by the resilient member such that the push member contacts the first and second release members of the operation device.

6. The housing assembly as claimed in claim 1, wherein the operation member includes a mounting member fixed to the link and a rotary member is connected to the mounting member so as to move the link which drives the first and second release members.

7. A housing assembly for electronic devices, comprising:
a first housing having multiple first positioning holes;
a second housing having multiple second positioning holes;
an assembly unit connected between the first and second housings;
at least two engaging devices connected to the assembly unit and each engaging device including a frame and a fixing member which is movably connected to the frame, the frame has a transverse space and a longitudinal opening which extends through the transverse space, a first engaging member and a second engaging member located in the transverse space of the frame, a first resilient member located between the first engaging member and the fixing member such that the first engaging member is orientated toward one of the first positioning holes of the first housing, a second resilient member located between the second engaging member and the fixing member such that the second engaging member is orientated toward one of the second positioning holes of the second housing, the first engaging member having a first inclined portion and the second engaging member having a second inclined portion, and an operation device including a first release member connected to a first pair of the at least two engaging devices and having a first guide portion located corresponding to the first inclined portion of the first engaging member of the engaging device, the first release member having a second guide portion located corresponding to the second inclined portion of the second engaging member of the engaging device, a second release member connected to a second pair of the at least two engaging devices and having a first guide portion located corresponding to the first inclined portion of the first engaging member of the engaging device, the second release member having a second guide portion located corresponding to the second inclined portion of the second engaging member of the engaging device, a link pivotably connected to the assembly unit and connected with the first and second release members, an operation member connected to the link so as to move the link and the first and second release members, the first release member and the second release member respectively driving a pair of the first engaging members and the second engaging members.

8. The housing assembly as claimed in claim 7, further comprising a resilient device, the resilient device including a resilient member which is located between the assembly unit and the operation device so that the operation device moves to an initial position by the resilient member.

9. The housing assembly as claimed in claim 8, wherein the resilient device includes a base and a push member which extends through the base, the push member includes a contact portion contacting the base, the resilient member is located between the push member and the assembly unit, the push member is pushed relative to the base by the resilient member such that the push member contacts the first and second release members of the operation device.

* * * * *